United States Patent [19]

Montrone et al.

[11] Patent Number: 4,707,800
[45] Date of Patent: Nov. 17, 1987

[54] ADDER/SUBSTRACTOR FOR VARIABLE LENGTH NUMBERS

[75] Inventors: Dale L. Montrone, Londonderry, N.H.; Edward T. Lewis, Sudbury, Mass.

[73] Assignee: Raytheon Company, Lexington, Mass.

[21] Appl. No.: 708,185

[22] Filed: Mar. 4, 1985

[51] Int. Cl.[4] .......................... G05F 7/50; G06F 7/38
[52] U.S. Cl. .................... 364/788; 364/749; 364/786
[58] Field of Search ................. 364/784–788, 364/749, 736, 200 MS File, 768

[56] References Cited

U.S. PATENT DOCUMENTS

| | | | |
|---|---|---|---|
| 3,100,835 | 1/1960 | Bedrij | 364/788 |
| 3,676,657 | 7/1972 | De Boer | 364/786 |
| 3,767,906 | 10/1973 | Pryor | 364/786 |
| 3,993,891 | 10/1976 | Beck et al. | 364/788 |
| 4,052,604 | 10/1977 | Maitland et al. | 364/786 |
| 4,439,835 | 3/1984 | Best et al. | 364/786 |
| 4,523,292 | 6/1985 | Armer | 364/786 |
| 4,536,855 | 8/1985 | Morton | 364/786 |
| 4,573,137 | 2/1986 | Ohhashi | 364/788 |

Primary Examiner—Gary V. Harkcom
Assistant Examiner—Tan V. Mai
Attorney, Agent, or Firm—Philip J. McFarland

[57] ABSTRACT

An adder/subtractor wherein N/2 two bit adders are connected to allow the addition of numbers having N bits, each one of the two bit adders having associated control circuitry adapted: (a) to cause each two bit adder either to add applied bits directly or to add one applied bit and the "two's complement" of the other bit; and (b) to electrically separate any selected ones of the two bit adders from the others.

2 Claims, 3 Drawing Figures

ADDER/SUBSTRACTOR FOR VARIABLE LENGTH NUMBERS

CROSS-REFERENCE TO RELATED APPLICATIONS

U.S. patent application Ser. No. 667,198 filed Nov. 1, 1984.

U.S. patent application Ser. No. 667,199 filed Nov. 1, 1984, now U.S. Pat. No. 4,675,835.

BACKGROUND OF THE INVENTION

This invention pertains generally to circuitry for use in digital computers, and particularly to integrated circuitry that may be operated as either an adder or a subtractor in digital computers utilizing large scale integrated (LSI) circuitry.

With the development of LSI, it has become increasingly important that the speed of operation of the major subassemblies in a digital computer be maximized and that such subassemblies be adapted to perform, as required, different arithmetic functions. In U.S. patent application Ser. No. 667,198, filed Nov. 1, 1984 and assigned to the same assignee as this application, an improved adder for 32 bit numbers is disclosed. Such adder, while it is faster than any previously known adder, is best used in applications wherein "full length" numbers are to be added. That is to say, if shorter numbers, say two or four bit numbers, are to be added, the circuitry disclosed in the referenced application would require the same time to operate as would be required to add two 32 bit numbers. Further, the circuitry disclosed in the referenced application may be used only for adding and not for other common procedures, as subtracting numbers.

SUMMARY OF THE INVENTION

With this background of the invention in mind, it is, therefore, a primary object of this invention to provide LSI circuitry that may, as required, operate either to add or subtract numbers.

It is another object of this invention to provide LSI circuitry in which numbers of different lengths may be processed most efficiently.

The foregoing and other objects of this invention are generally attained by providing LSI circuitry using conventional two bit adders interconnected to effect the addition or subtraction of numbers, each one of the two bit adders being controlled by signals from associated logic networks that determine the number of two bit adders that are activated at any time and the mode of operation of the activated ones of the two bit adders so that numbers of different lengths may be added or subtracted as desired.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Before referring to the FIGURES in detail, it will be observed that, in any adder stage used in a multibit adder, there are three inputs (A, B (the bits to be added) and $C_{IN}$ (the carry-in signal)) and two outputs (S (the sum signal) and $C_{OUT}$ (the carry-out signal)). When a number (here N/2) of 2 bit adder stages are combined to form a multibit adder, the carry-out signal of the least significant stage is the carry-in signal to the next least significant stage and so on until the carry-in signal to the most significant stage is obtained. It will also be appreciated that the subtraction of two binary numbers (A−B) may be accomplished through an arithmetic sum of the minuend (A) and the "two's complement" of the subtrahend (B), where the "two's complement" of the binary number B is defined as the complement of the number, $\overline{B}$, plus one. It will also be appreciated that there is no carry-in signal to the least significant stage of any adder or subtractor.

Figure 1:
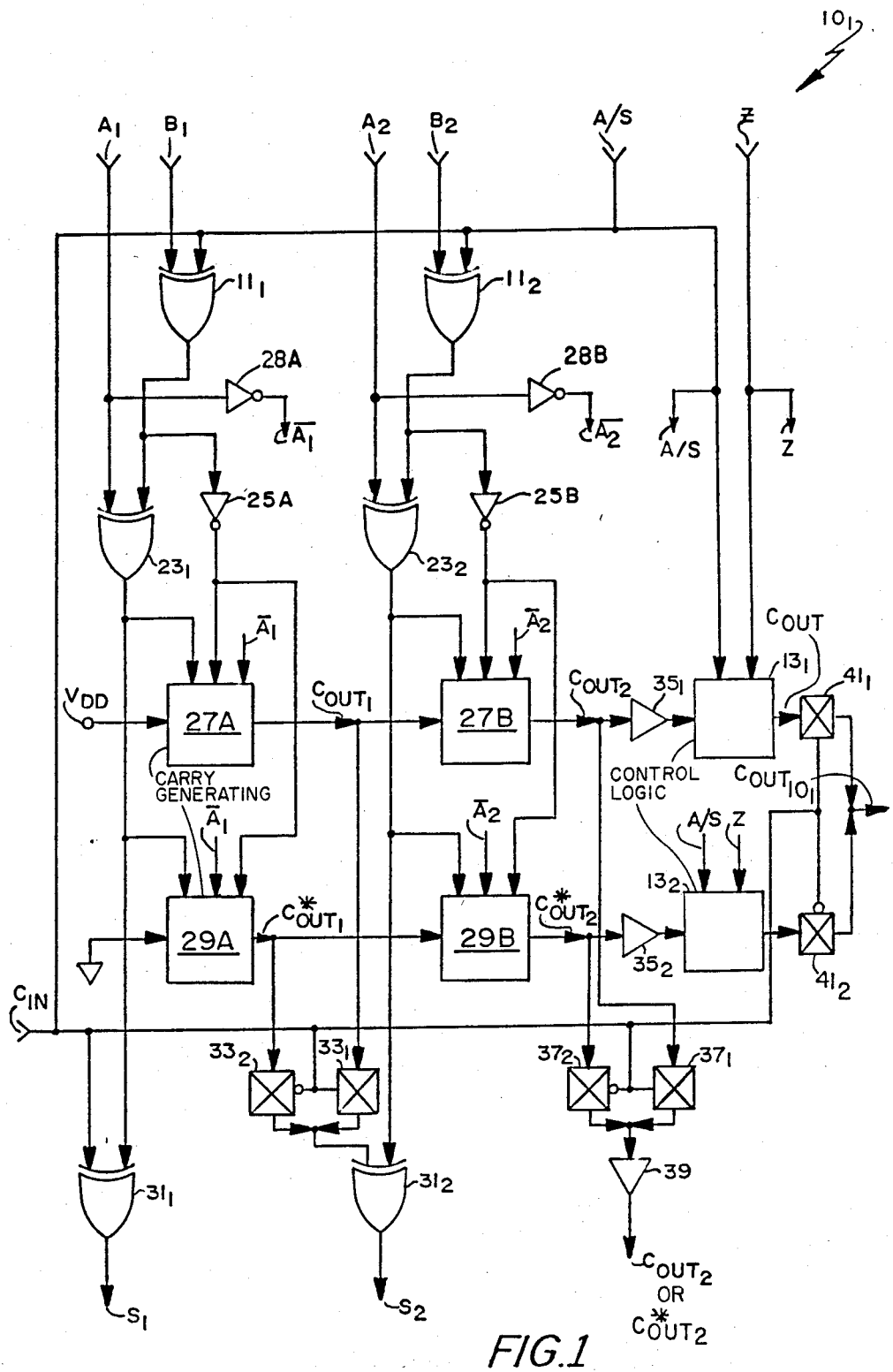
FIG. 1 is a simplified diagram of the adder stages for the two least significant bits of digital numbers being processed.

Referring now to FIG. 1, it will be apparent to those of skill in the art that the illustrated adder/subtractor 101 includes, in addition to known two bit adder circuitry, exclusive-OR gates $11_1$, $11_2$ and logic networks $13_1$, $13_2$. The exclusive-OR gates $11_1$, $11_2$ respond, as shown, to the $B_1$ and $B_2$ input signals and an add/subtract (A/S) control signal. When the A/S control signal is at a logic level "0" (meaning "ADD"), the outputs of the exclusive-OR gates $11_1$, $11_2$ are the same as the $B_1$, $B_2$ input signals. When the A/S control signal is at a logic level "1" (meaning "SUBTRACT"), the outputs of the exclusive-OR gates are the "two's complement" of the $B_1$, $B_2$ input signals. The A/S control signal is also applied, together with a field length control signal (Z), to identical control logic networks $13_1$, $13_2$.

Figure 2:
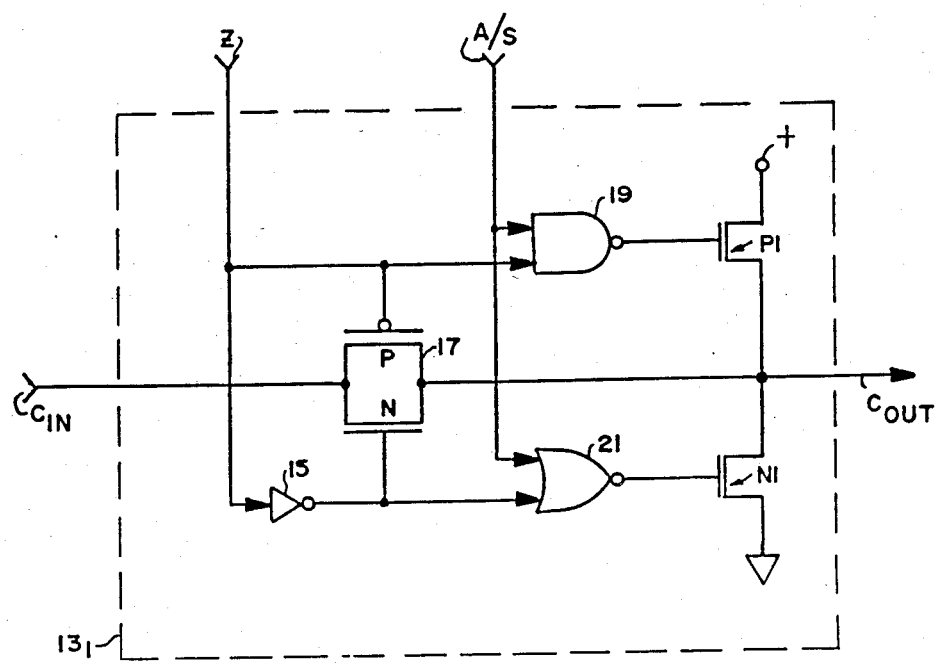
FIG. 2 is a schematic diagram of an exemplary logic network as shown in FIG. 1.

Referring briefly now to FIG. 2, an exemplary one of the control logic networks, here logic network $13_1$, is shown to receive a carry-in, $C_{IN}$, input (which is the same as the extant carry-out, $C_{OUT}$ 2, in FIG. 1) in addition to the Z and A/S control signals. The logic network $13_1$ comprises an inverter 15, a transmission gate 17, a NAND gate 19, a NOR gate 21, a p-channel field effect transistor FET P1, and an n-channel FET N1, all arranged to provide a carry-out, $C_{OUT}$, output in accordance with TABLE I:

TABLE I

| Z | A/S | $C_{OUT}$ |
|---|-----|-----------|
| 0 | 0   | $C_{IN}$  |
| 0 | 1   | $C_{IN}$  |
| 1 | 0   | 0         |
| 1 | 1   | 1         |

From inspection of Table I it may be seen that, when the field length control signal, Z, is a logic level zero, the transmission gate 17 is effective to pass the carry-in, $C_{IN}$, input as the carry-out, $C_{OUT}$, output, regardless of the state of the add/subtract, A/S, control signal. This is the normal mode of operation of the control logic networks wherein the carry signal is allowed to propagate to successive 2 bit stages of an N bit adder/subtractor. When the field length control signal, Z, is set to a logic level one (meaning that the field length is to be changed and two new digital numbers are to be either added or subtracted beginning at the next two bit stage of the adder/subtractor), the carry-out output, $C_{OUT}$, is set to either a logic level zero or a logic level one, depending, respectively, on whether the new digital numbers are to be added or subtracted. Thus, when the field length control signal, Z, is a logic level one, the transmission gate 17 is inhibited and either FET P1 or FET N1 is turned ON (depending on the status of the A/S control signal) to provide the $C_{OUT}$ output signal. When the Z control signal is a logic level one and the A/S control signal is a logic level zero, the NOR gate 21 provides a logic level one output that is effective to turn "ON" FET N1 and provide a logic level zero as the $C_{OUT}$ output. On the other hand, when the Z and A/S control signals are a logic level one, the NAND gate 19 provides a logic level zero output that is effective to turn "ON" FET P1 and provide a logic level one as the $C_{OUT}$ output.

Referring back now to FIG. 1, the output signals from the exclusive-OR gates $11_1$, $11_2$ are applied, as shown, to exclusive-OR gates $23_1$, $23_2$ for combination with $A_1$ and $A_2$ inputs, respectively. The output signal from exclusive OR gate $11_1$ is also inverted by an inverter 25A to form a $\overline{B_1 \oplus A/S}$ control signal for carry-generating circuits 27A, 9A, while the output signal from exclusive-OR gate $11_2$ is inverted in an inverter 25B to form a $\overline{B_2 \oplus A/S}$ control signal for carry generating circuits 27B, 29B. Similarly, the $A_1$ and $A_2$ inputs are inverted in inverters 28A, 28B. The output signals from exclusive-OR gates $23_1$, $23_2$ are provided, respectively, (a) as input signals to exclusive-OR gates $31_1$, $31_2$, and (b) as control signals to carry generating circuits 27A, 29A and 27B, 29B. With the exception that $\overline{B_1}$ and $\overline{B_2}$ inputs have been replaced by $\overline{B_1 \oplus A/S}$ and $B_2 \oplus A/S$ inputs, the carry-generating circuits 27A, 29A here are identical to those described in detail in a co-pending U.S. patent application Ser. No. 667,199 filed Nov. 1,1984 and assigned to the same assignee as this application. Suffice it to say that the carry generating circuit 27A is provided with a fixed carry-in, $C_{IN}$, input at a logic one level and the carry generating circuit 29A has a fixed $C_{IN}$ input at a logic zero level so that with the adder/subtractor 10 in the ADD mode (i.e., with the A/S control signal set to a logic level zero), operation is in accordance with Tables II and III, respectively.

TABLE II

| $C_{IN}$ | $A_1$ | $B_1$ | A/S | $EOR_{11_1}$ | $EOR_{23_1}$ | OUTPUT 27A |
|---|---|---|---|---|---|---|
| 1 | 0 | 0 | 0 | 0 | 0 | 0 |
| 1 | 0 | 1 | 0 | 1 | 1 | 1 |
| 1 | 1 | 0 | 0 | 0 | 1 | 1 |
| 1 | 1 | 1 | 0 | 1 | 0 | 1 |

TABLE III

| $C_{IN}$ | $A_1$ | $B_1$ | A/S | $EOR_{11_1}$ | $EOR_{23_1}$ | OUTPUT 29A |
|---|---|---|---|---|---|---|
| 0 | 0 | 0 | 0 | 0 | 0 | 0 |
| 0 | 0 | 1 | 0 | 1 | 1 | 0 |
| 0 | 1 | 0 | 0 | 0 | 1 | 0 |
| 0 | 1 | 1 | 0 | 1 | 0 | 1 |

Alternatively, with the adder/subtractor $10_1$ in the SUBTRACT mode (i.e., with the A/S control signal set to a logic level one), the carry generating circuits 27A, 29A operate in accordance with TABLES IV and V, respectively.

TABLE IV

| $C_{IN}$ | $A_1$ | $B_1$ | A/S | $EOR_{11_1}$ | $EOR_{23_1}$ | OUTPUT 27A |
|---|---|---|---|---|---|---|
| 1 | 0 | 0 | 1 | 1 | 1 | 1 |
| 1 | 0 | 1 | 1 | 0 | 0 | 0 |
| 1 | 1 | 0 | 1 | 1 | 0 | 1 |
| 1 | 1 | 1 | 1 | 0 | 1 | 1 |

TABLE V

| $C_{IN}$ | $A_1$ | $B_1$ | A/S | $EOR_{11_1}$ | $EOR_{23_1}$ | OUTPUT 29A |
|---|---|---|---|---|---|---|
| 0 | 0 | 0 | 1 | 1 | 1 | 0 |
| 0 | 0 | 1 | 1 | 0 | 0 | 0 |
| 0 | 1 | 0 | 1 | 1 | 0 | 1 |
| 0 | 1 | 1 | 1 | 0 | 1 | 0 |

The carry-out output, $C_{OUT1}$, of the carry generating circuit 27A is provided as an input to a carry generating circuit 27B and to a transmission gate $33_1$. Likewise, the carry-out output, $C^*_{OUT1}$, of the carry generating circuit 29A (where the asterisk is used to designate the carry chain originating with a logic level zero input) is provided as an input to both a carry generating circuit 29B and a transmission switch $33_2$. The carry generating circuits 27B, 29B here are identical to the carry generating circuits 27A, 29A and, therefore, their operation in the ADD mode is outlined in TABLES II and III, and their operation in the SUBTRACT mode is presented in TABLES IV and V.

The carry-out output, $C_{OUT2}$, of carry generating circuit 27B is passed, via a noninverting amplifier $35_1$, to the control logic network $13_1$ and is also provided as an input to a transmission switch $37_1$. Similarly, the carry-out output, $C^*_{OUT2}$, from carry generating circuit 29B is passed, via a noninverting amplifier $35_2$, to the control logic network $13_2$, and is also provided as an input to a transmission switch $37_2$.

It should be noted here that the adder/subtractor $10_1$ operates on the two least significant bits of a pair of multibit numbers ($A_N$ and $B_N$), with the A/S control signal also utilized as the second input signal for the exclusive-OR gate $31_1$. This means that carry generating circuits 27A, 27B and associated gates are inoperative when the A/S control signal is at a logic level zero and that carry generating circuits 27B, 29B are then operative. In the ADD mode (i.e., with the A/S control signal set to a logic level zero), the exclusive-OR gate 311 is effective to form the $S_1$ output signal which may be expressed as $A_1 \oplus B_1 \oplus A/S \oplus C_{IN}$, and the exclusive-OR gate $31_2$ is effective to form the $S_2$ output which may be expressed as $A_2 \oplus B_2 \oplus A/S \oplus C^*_{OUT1}$. The carry-out output, $C^*_{OUT2}$, associated with the $S_2$ output is provided via the transmission switch $37_2$ and a buffer amplifier 39. The $C^*_{OUT2}$ output is also passed, via the amplifier $35_2$, the control logic network $13_2$ (assuming that the field length control signal, Z, to the latter is not set to a logic level one) and a transmission switch $41_2$ as the carry-in input to the next succeeding two bit stage (not shown). In all subsequent stages of the adder/subtractor 50, the A/S control signal is not tied to the carry-in input and, therefore, the sum (and difference) outputs from each subsequent stage are dependent on the carry-in (borrow-in) input from the previous stage.

As mentioned briefly hereinabove, when the subtraction of two multibit binary numbers (A−B) is desired, this may be accomplished through an arithmetic sum of the minuend (A) and the "two's complement" of the subtrahend (B). It should now be appreciated that in the SUBTRACT mode (i.e., when the A/S control signal is set to a logic level one) the exclusive-OR gates $11_1$, $11_2$ are effective to form the complement of the $B_1$ and $B_2$ inputs, respectively, and that carry generating circuitry 27A, 29A are then operative.

It will be recognized that a carry-in signal will be generated for any additional stages so the A/S signal will not be the appropriate second input signal in any additional stage for the exclusive-OR gate corresponding to the exclusive-OR GATE 31 in FIG. 1. It follows, then, that the connection between exclusive-OR gates $11_1$ and $31_1$ is not made in any additional stage.

Figure 3:
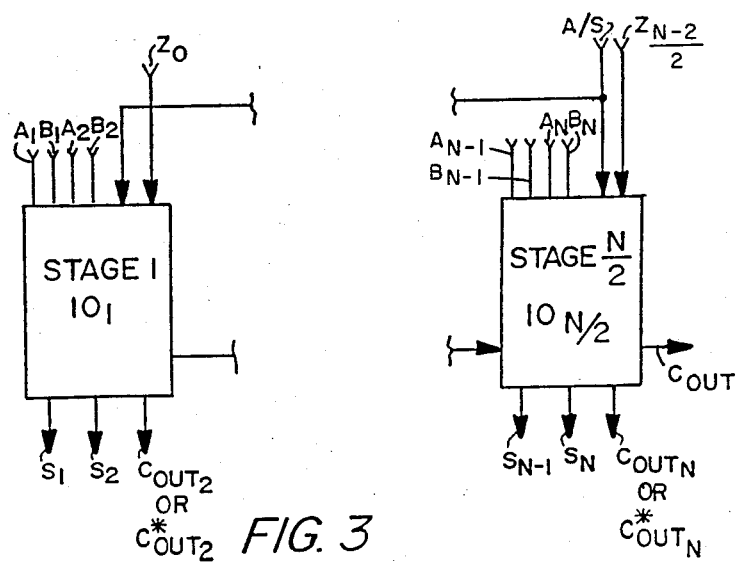
FIG. 3 is a simplified block diagram illustrating how an "N" bit adder (or subtractor) may be formed.

Referring briefly now to FIG. 3, the manner in which the two bit adder/subtractor may be combined to form an N-bit adder/subtractor 50 is illustrated. Each of the two bit adder/subtractor stages $10_1$ through $10_{N/2}$ is identical to the two bit adder/subtractor $10_1$ (FIG. 1). It should be noted that a carry-in input, $C_{IN}$, is not shown to be applied to the adder/subtractor 50 as, it will be recalled, the A/S control signal serves as the carry-in (borrow-in) input to the least significant bit. A field length control signal, $Z_0$ through $Z_{N-1}$, is applied to each two bit stage of the adder/subtractor 50. The field of the adder/subtractor 50 is controlled by setting the control signal Z to a logic level one at the two bit stage preceding the beginning of a new word. Because the level of the control signal Z may be changed at each stage, and because the carry-out signal at each stage is available, it is possible to use different parts of the adder/subtractor 50 to add (or subtract) numbers having a smaller number of bits than N. For example, the "least significant" half of the adder/subtractor 50 may be used to add (or subtract) two numbers having up to N/2 bits, while the "most significant" half of the adder/subtractor 50 is simultaneously adding (or subtracting) two different numbers. To accomplish such operation the Z control signal would be set to logic level one in the first and (N/4−1) stages with the Z control signals at a logic level zero in all other stages.

Having described a preferred embodiment of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. In a multi-bit adder wherein digital numbers, each having N bits, where N is an even number greater than four, may be added in connected stages so that appropriate carry signals may be propagated from stage to stage, the improvement comprising:
   (a) first control circuitry, responsive to a first signal having either a logic one or a logic zero level, for electrically separating selected ones of the connected stages to allow digital numbers, each having less than N bits, to be processed simultaneously; and
   (b) second control circuitry, responsive to a second signal having either a logic one or logic zero level, for converting one of the numbers applied to each one of the connected stages to its "two's complement" so that the result of addition in each one of the connected stages is the subtraction of one of the applied numbers from the other numbers.

2. The improvement as in claim 1 wherein the first control circuitry comprises a transmission gate responsive to the level of the first signal to pass the carry signal from stage to stage when the first signal is at a logic zero level and to inhibit passage of the carry signal from stage to stage when the first signal is at a logic one level.

* * * * *